United States Patent [19]

Merrill

[11] 3,721,694
[45] March 20, 1973

[54] FLUOROSULFONATE COMPOUNDS AND METHOD OF THEIR PREPARATION

[75] Inventor: Claude I. Merrill, Lancaster, Calif.

[73] Assignee: The Dow Chemical Company, Midland, Mich.

[22] Filed: June 13, 1968

[21] Appl. No.: 736,863

[52] U.S. Cl............260/456 A, 149/109, 260/543 H, C07c/143/02
[58] Field of Search..........260/501.14, 456 A, 543 H

[56] References Cited

UNITED STATES PATENTS 3,375,259   3/1968   Gibson et al......................149/109 X Primary Examiner—Leland A. Sebastian
Attorney—C. Kenneth Bjork and L. S. Jowanovitz

[57] ABSTRACT

The invention is to the compounds perfluoroformamidine fluorosulfonate and [tris(fluorosulfonate)methyl] fluorosulfonatofluoroamine and a method for their preparation by reacting perfluoroguanidine and peroxy-disulfuryl difluoride.

6 Claims, No Drawings

FLUOROSULFONATE COMPOUNDS AND METHOD OF THEIR PREPARATION

SUMMARY OF THE INVENTION

This invention relates to fluorine-nitrogen--sulfur containing organic compounds and in particular is concerned with the novel compounds perfluoroformamidine fluorosulfonate and [tris(fluorosulfonato)methyl] fluorosulfonatofluoroamine and to a process for their preparation.

The perfluoroformamidine fluorosulfonate compound is a colorless liquid at room temperature having a relatively low boiling point which has the formula

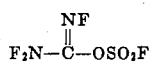

The compound [tris(fluorosulfonato)methyl] fluorosulfonatofluoroamine, is a colorless liquid having a boiling point of greater than 200° C. This compound has the formula

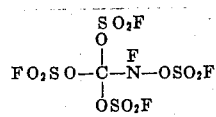

These compounds are suitable for use as oxidizers, for example, as in propellant formulations for propulsion of rockets and missiles. They also are suitable for use in other applications requiring an oxidizer with high oxidizing potential.

In general, the compounds are prepared by reacting perfluoroguanidine,

with peroxydisulfuryl difluoride, $S_2O_6F_2$, usually at about room temperature. The product compounds are recovered by first separating volatile materials from the reaction mass and isolating and recovering the coproduced products of the present invention by chromatographic or other separatory techniques.

DESCRIPTION OF A PREFERRED EMBODIMENT

In a preferred embodiment of the present invention, about stoichiometric, i.e. molar equivalent, quantities of perfluoroguanidine and peroxydisulfuryl difluoride are contacted in the presence of a catalyzing amount of cesium fluorosulfonate ($CsOSO_2F^-$) as reaction promoter in a sealed reactor under autogeneous pressure and with agitation at about room temperature (i.e. about 18°–25° C.) for a period of at least about 6 hours, usually from about 12 to about 48 hours or more. The cesium fluorosulfonate is merely a promoter and can be readily recovered or separated from the product mass. Effective quantities of this reaction promoter range from less than 1 weight per cent up to 25 weight per cent or more of the active reactants.

Volatile materials were removed by application of a reduced pressure and the perfluoroformamidine fluorosulfonate and [tris(fluorosulfonato)methyl] fluorosulfonatofluoramine products condensed and recovered in a purified form by chromatographic techniques.

The following Example will serve to further illustrate the present invention but is not meant to limit it thereto.

Example

About 214 milligrams of perfluoroguanidine and about 250 milligrams of peroxydisulfuryl difluoride (i.e. a $(NF_2)_2C=NF/S_2O_6F_2$ gram mole ratio of about 1) were condensed at a temperature of about minus 130° C. into a 20 milliliter capacity glass reactor having a Swagelock fitting and valve. About 0.1 gram of cesium fluorosulfonate, $CsOSO_2F$, was also charged to the reactor. The cesium fluorosulfonate was prepared by the reaction of cesium chloride with peroxydisulfuryl difluoride. The reactor valve was closed and the sealed reactor and contents placed into a methylene chloride bath at an initial temperature of about minus 70° C.

The reactor was gradually warmed to room temperature and allowed to stand at room temperature for about 48 hours after which volatile materials were stripped off under a low absolute pressure. During this operation the products were passed through a series of cold traps maintained at about minus 40° C., minus 80° C. and minus 196° C.

A low volatility product (vapor pressure less than about 2 millimeters) condensed in the first trap, a volatile liquid product was recovered in the second trap maintained at minus 80° C. and some highly volatile material also was collected in the minus 196° C. trap. This latter material was found to be primarily $NF_2OSO_2F$ with traces of $CO_2$, $N_2O$, $SiF_4$, cis-$N_2F_2$, $SO_2F_2$.

The liquid which condensed in the minus 80° C. trap was passed two times through a chromatographic column of 25 per cent polyperfluorotributylamine oil adsorbed on Chromosorb W diatomite aggregate.

A total of about 60 milligrams of a colorless liquid, subsequently identified as the novel compound perfluoroformamidine fluorosulfonate, was isolated and recovered along with unreacted peroxydisulfuryl difluoride.

The assigned structure of perfluoroformamidine fluorosulfonate was established from the molecular weight, NMR spectrum, mass spectrum and infrared spectrum. These analysis gave:

Molecular Weight (by vapor density)

Found 195
Calculated theoretical molecular weight 196

NMR Spectrum ($F^{19}$ with $CFCl_3$ as reference)

| Group | Peaks $\phi$ | Area Ratio |
|---|---|---|
| $NF_2$ | −7.33 | 2 |
| =NF | −45.4 | 1 |
| $OSO_2F$ | −48.5 | 1 |

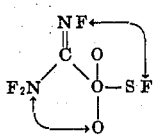

$J \approx 15$ cps.

$J \approx 4$ cps.

Mass Spectrum

| M/e | Abundance | Assignment |
|---|---|---|
| 144 | 8.7 | FNCOSO$_2$F |
| 97 | 1.2 | FNCNF$_2$ |
| 83 | 100.0 | SO$_2$F |
| 80 | 5.4 | SO$_3$ and OCNF$_2$ |
| 78 | 1.2 | F$_2$NCN and FNCNF |
| 67 | 9.7 | SOF |
| 64 | 7.5 | SO$_2$ |
| 61 | 9.2 | OCNF |
| 59 | 1.0 | NCNF |
| 52 | 2.9 | NF$_2$ |
| 51 | 1.0 | SF |
| 48 | 10.2 | SO |
| 45 | 0.6 | FNC |
| 42 | 5.8 | NCO |
| 40 | 1.3 | NCN |
| 33 | 9.0 | NF |

Infrared Spectrum

| Wave Length | Absorbance |
|---|---|
| 6.1 | sharp peak |
| 6.75 | " |
| 8.0 | " |
| 8.2 | " |
| 9.60–9.65 | band |
| 9.80–9.85 | " |
| 10.05–10.10 | " |
| 10.35 | peak |
| 10.60–10.70 | band |
| 11.25 | peak |
| 11.70–11.80 | band |
| 12.65 | narrow band |

Boiling Point (calculated)

~60° C.

The low volatility product in the minus 40° C. trap also was recovered and similarly analyzed. These analyses established this product to be [tris(fluorosulfonato)methyl] fluorosulfonatofluoramine. The results of these analytical slides are summarized as follows:

NMR Spectrum (F$^{19}$ with CFCl$_3$ as reference)

| Group | Peaks, φ | Ratio |
|---|---|---|
| NF | −18.6 | 1 |
| NOSO$_2$F | −42.5 | 1 |
| C(OSO$_2$F)$_3$ | −52.6 | 3 |

J=4.7 cps.   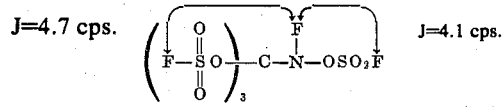   J=4.1 cps.

Mass Spectrum

| M/e | abundance | assignment | M/e | abundance | assignment |
|---|---|---|---|---|---|
| 127 | 24 | OCOSO$_2$F | 64 | 100 | SO$_2$ |
| 125 | 24 | NCOSO$_2$F | 61 | 3 | OCNF |
| 83 | 39 | SO$_2$F | 44 | 97 | CO$_2$ |
| 67 | 20 | SOF | 33 | 6 | NF |

Infrared Spectrum

| Wave Length | Absorbance |
|---|---|
| 6.75 | narrow band |
| 8.0–8.05 | band |
| 8.9–9.2 | broad band |
| 9.98 | peak |
| 10.55 | " |
| 10.80–10.90 | band |
| 11.60–12.05 | broad band |
| 12.45–12.55 | band |

Boiling Point (calculated)

>200° C.

Various modifications can be made in the present invention without departing from the spirit or scope thereof for it is understood that I limit myself only as defined in the appended claims.

I claim:

1. The compound perfluoroformamidine fluorosulfonate.

2. The compound [tris(fluorosulfonato)methyl] fluorosulfonatofluoroamine.

3. A process for preparing perfluoroformamidine fluorosulfonate and [tris(fluorosulfonato)methyl] fluorosulfonatofluoroamine which comprises;
   a. contacting a reaction mixture of perfluoroguanidine and peroxydisulfuryl difluoride at about room temperature,
   b. agitating the reaction mass for a period of at least about 6 hours,
   c. separating the co-produced perfluoroformamidine fluorosulfonate and [tris(fluorosulfonato)methyl] fluorosulfonatofluoroamine from the product mass, and
   d. recovering said perfluoroformamidine fluorosulfonate and said [tris(fluorosulfonato)methyl] fluorosulfonatofluoroamine.

4. The process as defined in claim 3 wherein about stoichiometric quantities of said perfluoroguanidine and said peroxydisulfuryl difluoride are reacted under autogeneous pressure for a period of from about 12 to about 48 hours and including the steps of condensing the product materials in a series of cold traps of different temperatures and recovering the so-condensed products in said trap by chromatographic techniques.

5. The process as defined in claim 4 wherein the product mixture is passed through a train of cold traps maintained respectively at about minus 40° C., minus 80° C. and minus 196° C., thereby condensing perfluoroformamidine fluorosulfonate product in said minus 80° C. trap, condensing [tris(fluorosulfonato)methyl] fluorosulfonatofluoroamine product in said minus 40° C. trap, and recovering said products from said traps.

6. The process as defined in claim 4 and including the step of incorporating an effective amount of cesium fluorosulfonate reaction promoter into the reaction mixture of said perfluoroguanidine and said peroxydisulfuryl difluoride.

* * * * *